United States Patent

Crouch et al.

[15] 3,635,608

[45] Jan. 18, 1972

[54] MAGNETIC DISK ASSEMBLY

[72] Inventors: Howard S. Crouch, Chandlers Ford; Hugh G. Dickie, North Baddesley; Albert H. Metcalfe, Fareham; Leo J. Rigbey, Winchester, all of England

[73] Assignee: International Business Machines Corporation, Armonk, N.Y.

[22] Filed: Mar. 18, 1970

[21] Appl. No.: 20,780

[30] Foreign Application Priority Data

Mar. 26, 1969 Great Britain ......................15,818/69

[52] U.S. Cl. .................206/62 R, 179/100.2 Z, 220/55 MG, 206/DIG. 33, 340/174.1 C

[51] Int. Cl. ..................B65d 21/02, B65d 45/00, G11b 1/02, G11b 11/02, G11b 17/26, G11b 23/04, G11b 25/04

[58] Field of Search ...................206/62 R, 62 P, 52 F, 46 PP, 206/DIG. 33; 220/55 MG, 44 A; 340/174.1 C, 174.1 R; 179/100.2 Z; 274/4 H, 4 R, 47

[56] References Cited

UNITED STATES PATENTS

| | | | |
|---|---|---|---|
| 3,526,884 | 9/1970 | Buslik et al. | 179/100.2 Z |
| 3,074,545 | 1/1963 | Lasher | 206/52 R |
| 2,147,482 | 2/1939 | Butler | 220/55 MG |
| 2,030,465 | 2/1936 | Nist | 206/52 F |
| 3,369,653 | 2/1968 | Edwards | 206/52 F |
| 3,509,992 | 5/1970 | David | 206/52 R |
| 2,217,307 | 10/1940 | Carter et al. | 206/46 PP |

*Primary Examiner*—William T. Dixson, Jr.
*Attorney*—Hanifin and Jancin and Nathan N. Kallman

[57] ABSTRACT

A cartridge for a magnetic disk assembly includes a cover for enclosing a multiplicity of magnetic disks, the assembly having top, side, and bottom portions, wherein the side portion has an aperture for permitting the insertion of a magnetic transducer, the bottom portion has means for connecting the enclosed disk assembly to a drive unit and a removable base for covering the aperture in the side portion.

15 Claims, 8 Drawing Figures

INVENTORS.
HOWARD S. CROUCH
HUGH G. DICKIE
ALBERT H. METCALFE
LEO J. RIGBEY
BY Nathan N. Kallman
ATTORNEY

MAGNETIC DISK ASSEMBLY

BACKGROUND OF THE INVENTION

1. Field of the Invention

The present invention relates to a novel and improved cartridge for a magnetic disk assembly.

2. Description of the Prior Art

Random access disk memories have been used extensively in data processing systems. Such disk memories employ a disk assembly of one or more magnetically coated disks which can be mounted on a drive unit for recording on and reproducing data from the surfaces of the disk or disks. A cartridge or an enclosure or a cover is provided for the disk assembly to facilitate handling and storage, and to protect the surface of the disks during installation and removal from the drive unit. The cartridge prevents human contact with the disk surfaces and seals the disk assembly from airborne contaminants. Provision has been made to allow the necessary connections to be made with the drive unit, including the introduction of one or more transducers into close proximity to the disk surface and the attachment of the disk assembly to a drive shaft for rotation of the disk assembly.

Cartridges have been provided with a removable cover which can be detached when the base of the cartridge is attached to the drive unit, the base of the cartridge being rotated by the drive unit with the disk assembly. A cartridge has also been provided which encloses the disk assembly even when the disk assembly is attached to the drive unit. This type of cartridge is provided with an access door which is automatically opened when the cartridge is installed in the drive unit to allow for the insertion of a transducer. The cartridge is designed so that the disk assembly can rotate relative to the cartridge when the cartridge is installed in the drive unit and so that the disk assembly is fixed relative to the cartridge when it is removed from the drive unit.

SUMMARY OF THE INVENTION

An object of this invention is to provide a novel and improved magnetic disk assembly for use in a magnetic disk drive.

Another object of this invention is to provide a magnetic disk assembly which is easily connected to the drive unit of a disk file.

BRIEF DESCRIPTION OF THE DRAWING

The invention will now be described by way of example with reference to the drawings, in which.

DESCRIPTION OF THE PREFERRED EMBODIMENT

Figures 1A, 1B:
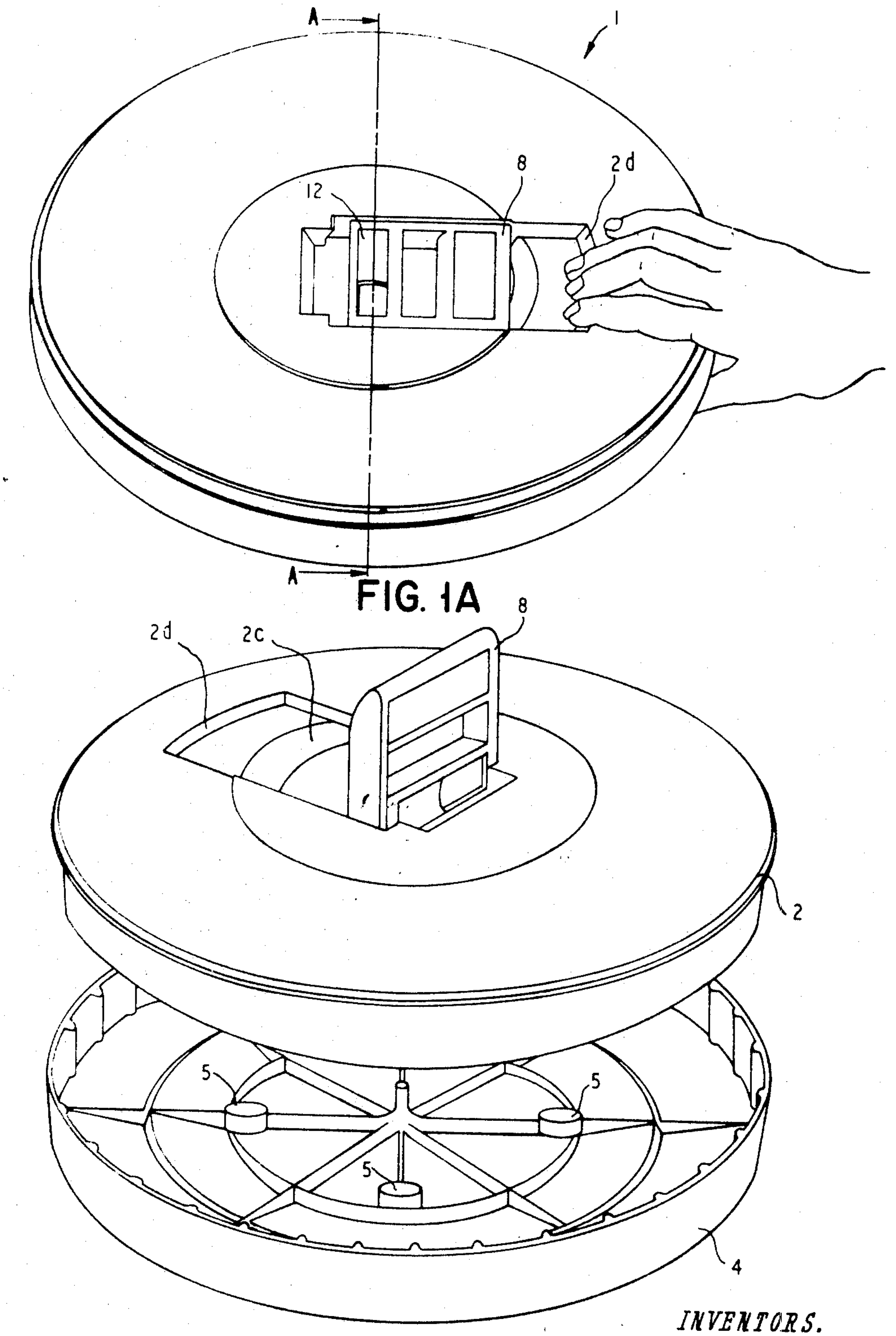
FIGS. 1A and 1B show the cartridge embodying the present invention.
Figure 2:
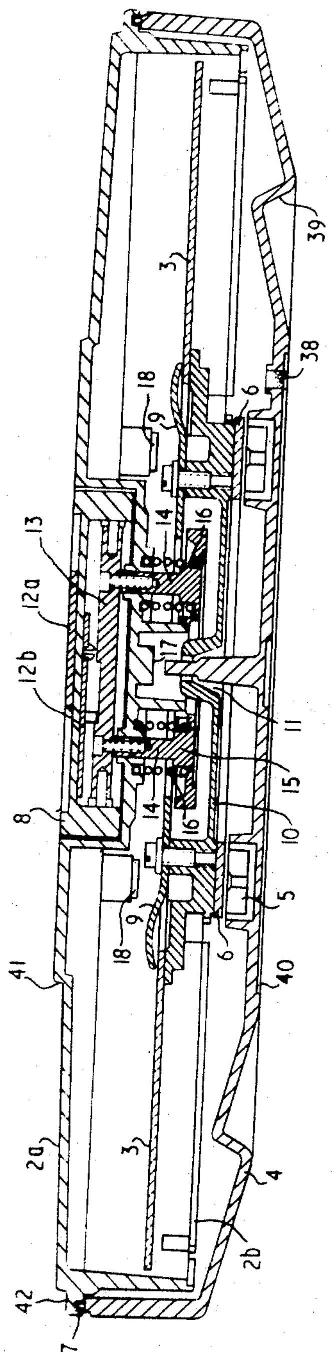
FIG. 2 is a cross section along the line AA in FIG. 1A.

FIGS. 1A, 1B and 2 illustrate a cartridge 1 having a cover 2 enclosing a magnetic disk 3 and a base 4 surrounding the lower part of the cover. The cover 2 and the base 4 are held together by four pot magnets 5 (FIG. 1B) molded into the base 4 and spaced at 90° intervals, and an armature 6 attached to the disk (FIG. 2). A rubber sealing ring 7 is interposed between the cover and the periphery of the base. The cover 2 consists of a molding *2a* having a top and a side portion, and a bottom plate *2b*. The top of the cover has a well *2c* (FIG. 1B) in which a folding handle 8 is located. The handle can be folded flush with the top of the cover to facilitate storage and stacking of the cartridges.

The magnetic disk 3 is clamped by a plate 9 to a flexible diaphragm 10. The flexible diaphragm has a tapered hole 11 at its center which engages a spindle of the drive unit. The armature 6 contacts the magnets 5 when the cover 2 and base 4 are fitted together. When the cartridge is positioned on the drive unit, the base is removed and the armature 6 contacts a magnet on the drive unit.

The handle 8 serves for carrying the cartridge, for releasing the base 4 from the cover 2, and for releasing the cover from the drive unit. The handle 8 is shown in greater detail in FIG. 5. When the handle is used for carrying the cartridge, the handle 8 is merely raised from the well in the cover. When the handle is to be used for releasing the cover from the base or for releasing the cover from the drive unit, a latch 12 on the handle is operated which causes drawbar 13 (FIG. 2) to be raised.

Drawbar 13 is fixed to a pair of pillars 14 of a drawplate 15 which is located inside the cover 2. A pair of springs 16 biases the drawplate to a position one-sixteenth inch below the clamping plate 9. As the handle is lifted to release the cover, the drawbar and drawplate move one-sixteenth inch to engage the clamping plate 9, a further one-sixteenth inch is taken up as the cover deflects, and finally a further one-sixteenth inch movement breaks the magnetic attraction between the armature 6 and the magnets 5 and releases the cover. A projection 17 on the cover prevents the cover from deflecting more than one-sixteenth inch and four rubber buffers 18 molded into the cover are positioned to engage the clamping plate 9 so that the disk is held firmly to the cover when the base is released.

Figure 3:
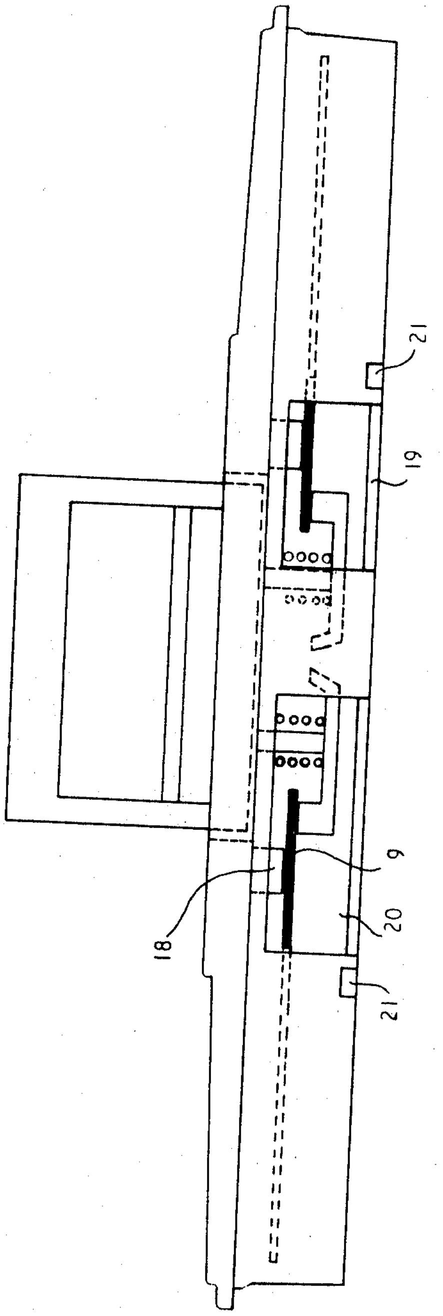
FIG. 3 shows the cartridge with its base removed.

FIG. 3 shows the cover of the cartridge released from the base. The clamping plate 9 is in contact with the buffers 18. Two apertures 19 and 20 are provided in the side of the cover to permit the insertion of the transducers and cleaning brushes for the surfaces of the disk, respectively. Slots 21 are provided for locating the cover at the correct angular position on the drive unit.

Figure 4:
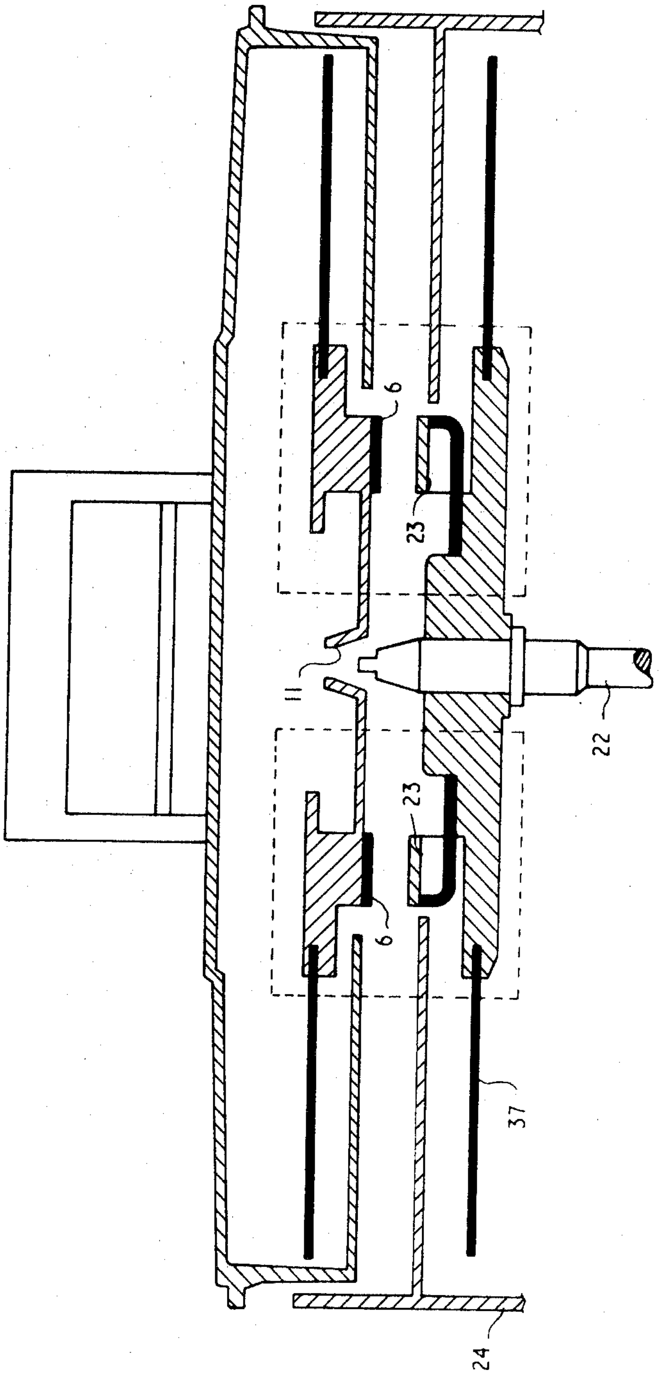
FIG. 4 shows the cartridge positioned on the drive unit.

FIG. 4 shows the cartridge being positioned on a drive unit 24. The tapered hole 11 in the flexible diaphragm is located on the conical end of the drive spindle 22. Ring magnet 23 mounted on the drive spindle contacts the armature 6 on the flexible diaphragm and pulls the disk firmly into engagement with the drive spindle. Some deflection of the flexible diaphragm (approximately 0.010 inch) occurs to insure accurate location of the tapered hole 11 on the spindle 22. In operation, filtered air is circulated from the center to the outside of the disk and through one of the holes 19 or 20 by rotation of the disk itself.

Figure 5:
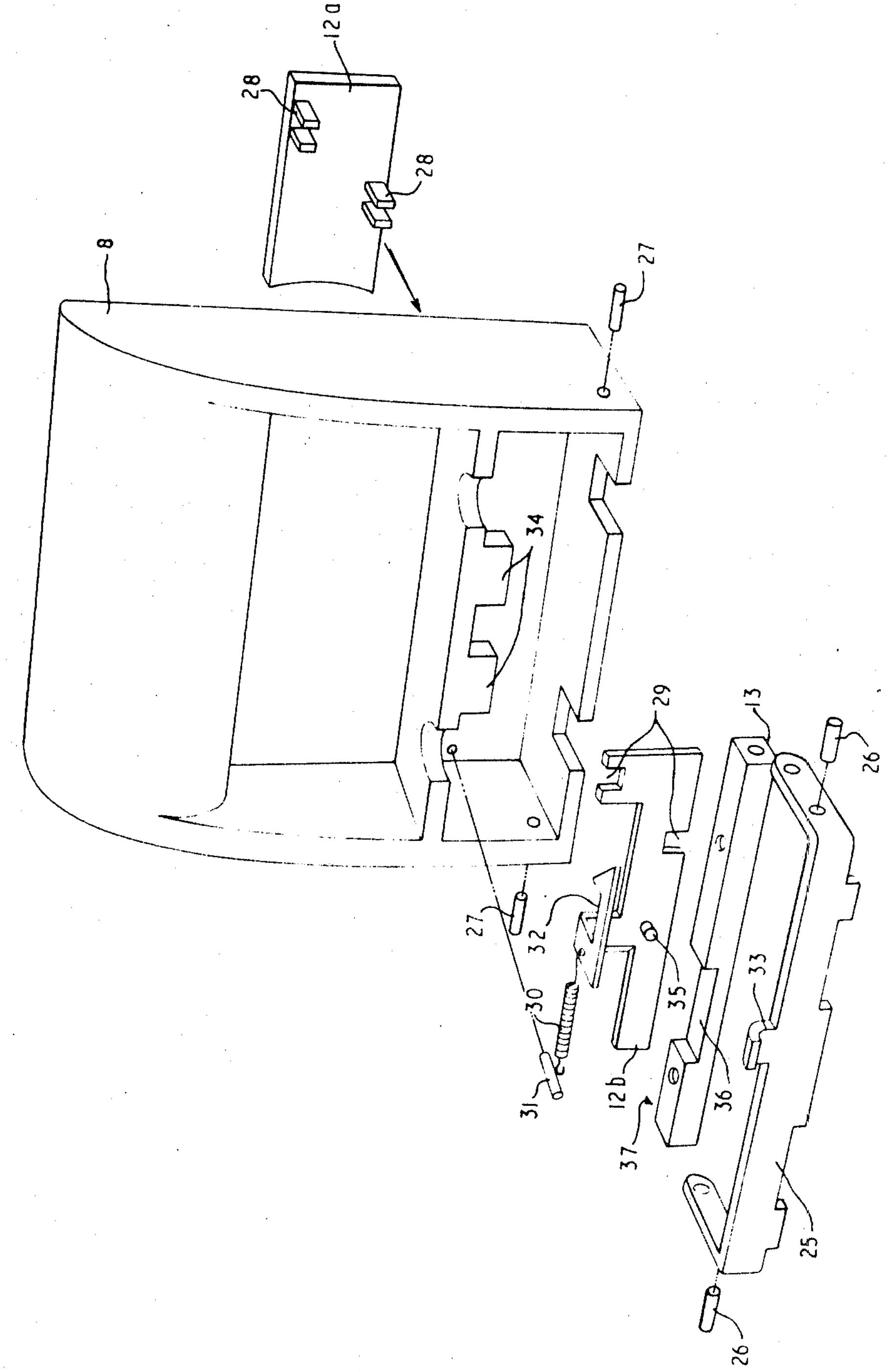
FIG. 5 shows the handle for the cartridge in greater detail.

The handle is shown in greater detail in FIG. 5. The drawbar 13 is pivotally mounted on a lever 25 by pins 26, the lever 25 being pivotally mounted inside the handle 8 by pins 27. The latch 12 consists of a part *12a* on the outside of the handle 8 and part *12b* on the inside. The parts *12a* and *12b* are jointed by two pairs of spring fingers 28 on part *12a* which engage slots 29 on part *12b*. The latch 12 is held in a left-hand position by a spring 30 fixed at one end to the handle by a pin 31. When the handle is used for carrying the cartridge, the handle is lifted to the position shown in FIG. 5 and no movement of the drawbar 13 occurs. However, when the handle is in the lower or rest position, the latch 12 can be moved to the right by pressing part *12a* so that a catch 32 on part *12b* engages projection 33 on lever 25. If the handle is lifted from the horizontal, with the catch in this position, the drawbar 13 is raised by the lever 25. During the raising of drawbar 13, the catch 32 is located behind two lifting lugs 34 on the handle which support the catch during the raising of the drawbar 13.

In the lower or rest position of the handle a projection 35 is situated in the slot 36. When the catch 32 has engaged the projection 33 and the handle 8 is lifted to the vertical, the projection 35 abuts the far side 37 of drawbar 13, i.e., the drawbar remains in the same angular position as the plate *12b* rotates with the handle through 90°. In the vertical position the projection 35 locks the catch 32 and projection 33 to prevent release of the drawbar until the handle is lowered.

Figure 6A:
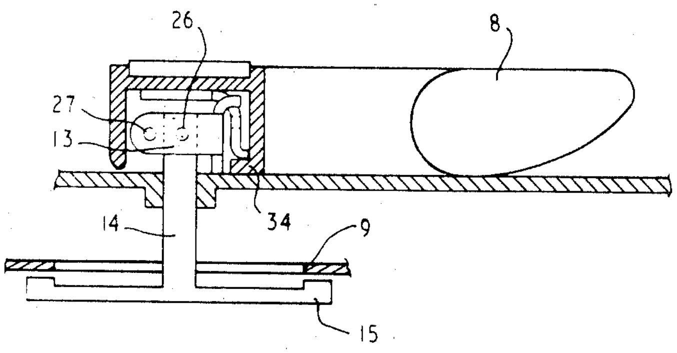
FIGS. 6A and 6B illustrate the operation of releasing the cover of the cartridge.
Figure 6B:
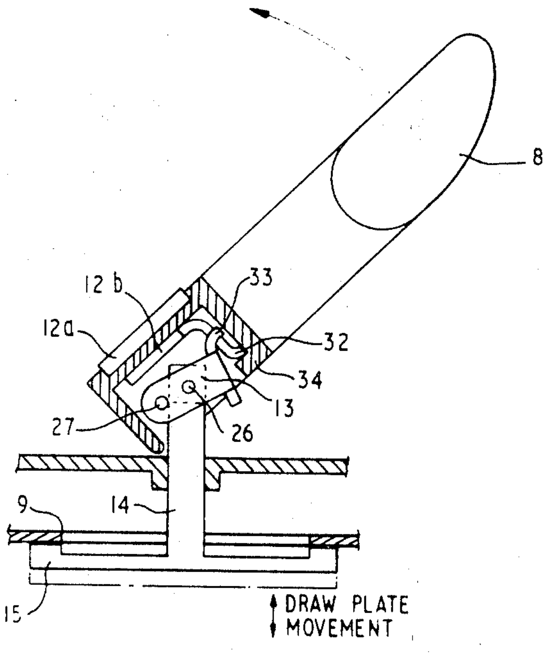

The movement of the drawplate 15 as the handle is raised is shown in FIG. 6B. As the drawbar 13 is raised, the pillars 14 lift drawplate 15 into contact with the clamping plate 9 which releases the armature from the magnet.

When the cartridge has been placed on the drive unit, it has been found advantageous to clamp the base in an inverted position on the cover so that its rim can provide a uniform clamping pressure to the cover. This also prevents dust particles collecting inside the base and loss or misplacement of the base when the cartridge is in use. These features improve the handling of the cartridge during unloading and loading. The cover has a rim 42 for locating the base, a stacking rim 41 (FIG. 2) and a local fingertip grip 2*d* (FIG. 1). The base has a matching stacking recess 40 and a continuous fingertip grip 39. Inside the base circumference air vents are provided to allow the cover to be removed without air drag as soon as the rim seal is broken. Alternatively, an air vent 38 (FIG. 2) in the base can be provided. The air vent 38 is covered by a filter to prevent the dust particles entering the container.

The disk assembly need not comprise a single disk but may includes two, three or more disks. In FIG. 4, the drive unit is shown which includes a fixed disk 37 which remains permanently in the drive unit. The disks are normally coated on both sides with magnetic material. Preferably, the cartridge incorporates a magnetic shielding material which protects the data recorded on the disk assembly.

What is claimed is:

1. A cartridge for a magnetic disk assembly comprising:

a cover for enclosing a magnetic disk assembly having a top, side and bottom portions;

said side portion having an aperture for permitting the insertion of a transducer;

said bottom portion having means for connecting an enclosed 7 disk assembly to a drive unit;

a removable base for covering said aperture in the side portion;

a handle mounted on the top portion of the cover, said handle being adapted to be folded against the top portion of said cover, said cover including a well into which said handle is positioned when folded, and said handle including means to be selectively operated for carrying said cartridge or for releasing said base from said cover.

2. A cartridge as in claim 1, wherein said connecting means comprises an aperture in the bottom of the cover, and in which the base is adapted to cover said aperture in the bottom of the cover.

3. A cartridge as in claim 1, including a magnetic disk assembly enclosed within said cover.

4. A cartridge as in claim 1, wherein the side portion of the cover has an aperture for permitting the insertion of a cleaning brush.

5. A cartridge as in claim 1, in which the cover and base are shaped to provide a stacking ring.

6. A cartridge as in claim 1, including a rubber sealing ring between the cover and the periphery of the base.

7. A cartridge as in claim 6, in which the cover and the base include air vents to allow the cover to be removed without air drag, when the seal provided by the rubber sealing ring is broken.

8. A cartridge as in claim 6, in which the base has an air vent covered by a filter.

9. A cartridge for a magnetic disk assembly comprising:

a cover for enclosing a magnetic disk assembly having a top, side and bottom portions;

said side portion having an aperture for permitting the insertion of a transducer;

said bottom portion having means for connecting an enclosed disk assembly to a drive unit;

a removable base for covering said aperture in the side portion;

a handle mounted on the top portion of the cover, said handle being adapted to be folded against the top portion of said cover, said cover including a well into which said handle is positioned when folded, and said handle including means to be selectively operated for carrying said cartridge or for releasing said base from said cover;

means for magnetically attaching said base to said cover, including an armature, and a magnet fixed to the base for contacting said armature when the cover and base are fitted together; and said handle including a drawbar connected to a drawplate, said drawplate being effective when the drawbar is actuated by the handle to separate the armature from said magnet and drive unit.

10. A cartridge as in claim 9, wherein said drive unit includes a magnet on said drive unit for engaging said armature, whereby the disk assembly can be rotated by the drive unit.

11. A cartridge as in claim 10, in which the disk assembly includes a flexible diaphragm having a tapered hole at its center, which tapered hole is adapted to engage a conical end of a drive spindle on said drive unit.

12. A cartridge as in claim 11, in which said armature is positioned on the periphery of said flexible diaphragm.

13. A cartridge as in claim 9, in which the handle includes means for releasing the cover from the drive unit.

14. A cartridge as in claim 9, in which the handle has a latch which can be operated so that the drawbar is lifted when the handle is being operated for releasing the cover.

15. A cartridge as in claim 14, in which the handle has a locking means which prevents release of the latch so that the drawbar cannot be released when the handle is being operated for releasing the cover.

* * * * *